United States Patent [19]

Machner

[11] 4,134,443

[45] Jan. 16, 1979

[54] METHOD OF AND APPARATUS FOR PRODUCING STEEL INGOTS

[75] Inventor: Peter Machner, Leoben, Austria

[73] Assignee: Vereinigte Edelstahlwerke Aktiengesellschaft, Vienna, Austria

[21] Appl. No.: 855,836

[22] Filed: Nov. 30, 1977

[30] Foreign Application Priority Data

Dec. 3, 1976 [DE] Fed. Rep. of Germany ....... 2654834

[51] Int. Cl.² ............................................. B22D 27/02
[52] U.S. Cl. ...................................... 164/52; 164/252
[58] Field of Search ................... 164/50, 52, 250, 252; 75/10 C, 10 R

[56] References Cited

U.S. PATENT DOCUMENTS

| 2,893,085 | 7/1959 | Johansson et al. ...................... 164/52 |
| 3,786,853 | 1/1974 | Cooper ................................... 164/52 |
| 3,916,978 | 11/1975 | Plockinger et al. ..................... 164/52 |
| 4,036,278 | 7/1977 | Ramacciotti ............................ 164/52 |

FOREIGN PATENT DOCUMENTS

| 1096560 | 1/1961 | Fed. Rep. of Germany ............. 164/52 |
| 1162094 | 1/1964 | Fed. Rep. of Germany ............. 164/52 |
| 1280506 | 10/1968 | Fed. Rep. of Germany ............. 164/52 |
| 2147548 | 11/1973 | Fed. Rep. of Germany ............. 164/52 |
| 1812102 | 2/1974 | Fed. Rep. of Germany ............. 164/52 |
| 4725967 | 7/1972 | Japan ...................................... 164/52 |

Primary Examiner—Francis S. Husar
Assistant Examiner—K. Y. Lin
Attorney, Agent, or Firm—Brumbaugh, Graves, Donohue & Raymond

[57] ABSTRACT

In a method of and apparatus for producing ingots of unalloyed and alloyed steels having an improved primary crystallization, reduced ingot segregation and a reduced content of non-metallic inclusions, molten steel is poured into a mould, a slag mixture is supplied onto said steel, and energy is supplied to the slag mixture via at least one consumable electrode while the steel is solidifying. The slag mixture has a certain height corresponding at most to the relationship 0.15 (A + 100), wherein A is the shortest distance between the inner mould wall and the at least one consumable electrode, given in cm and amounting to at least 5 cm. Also, at least one consumable electrode has dimensions such that the ratio of the electrode cross-sectional area(s) to the mould cross-sectional area amounts to 1:10 at most.

10 Claims, 10 Drawing Figures

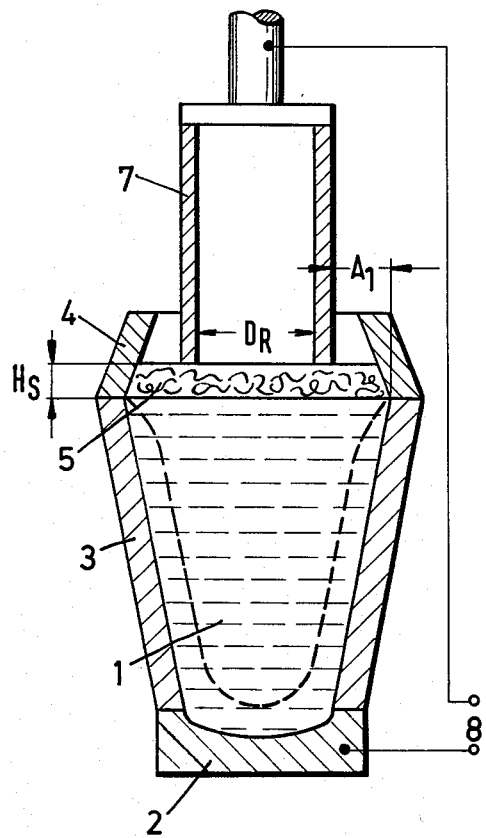
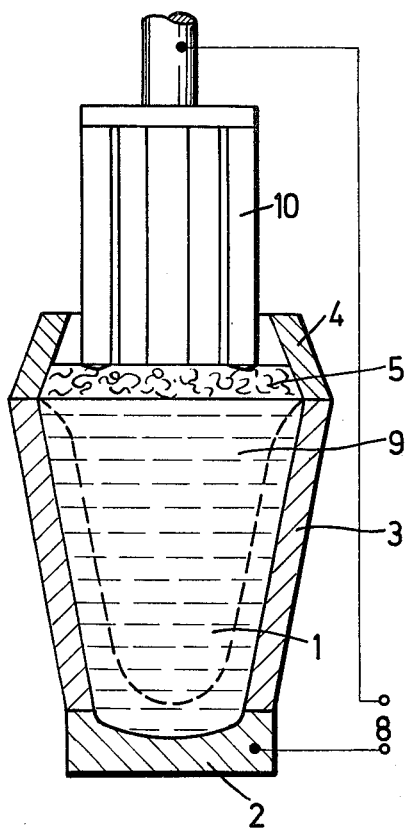
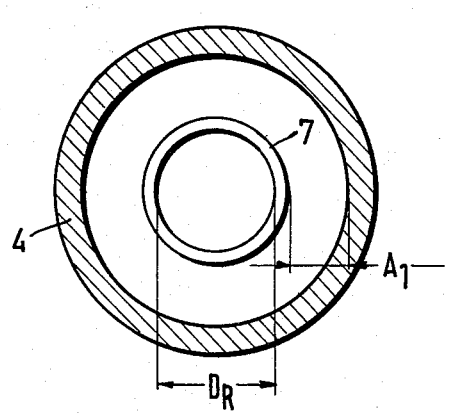
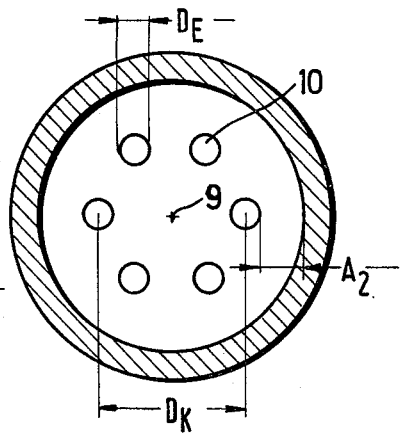

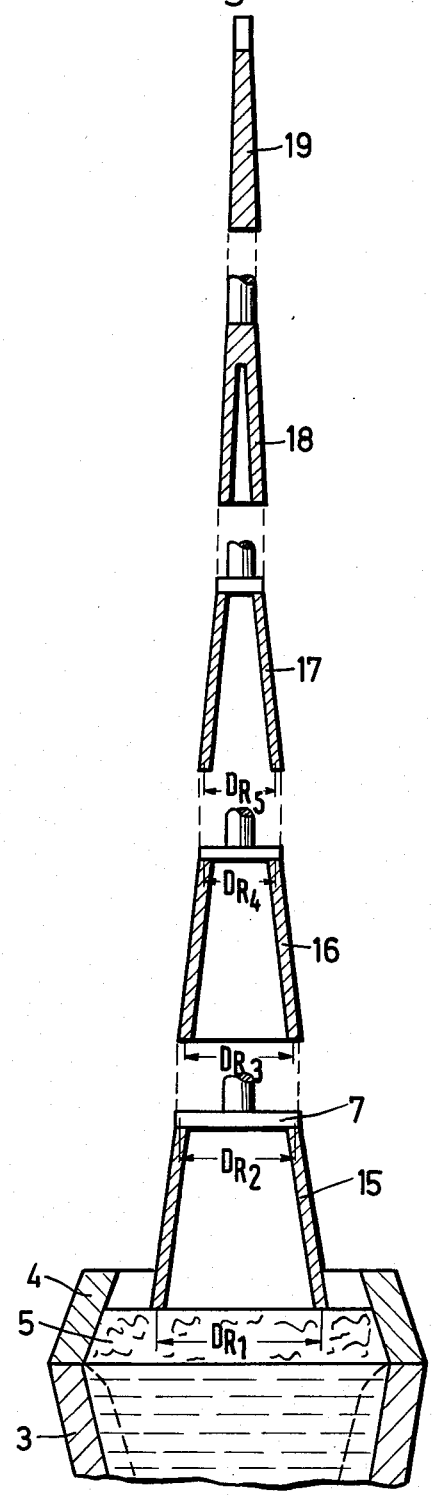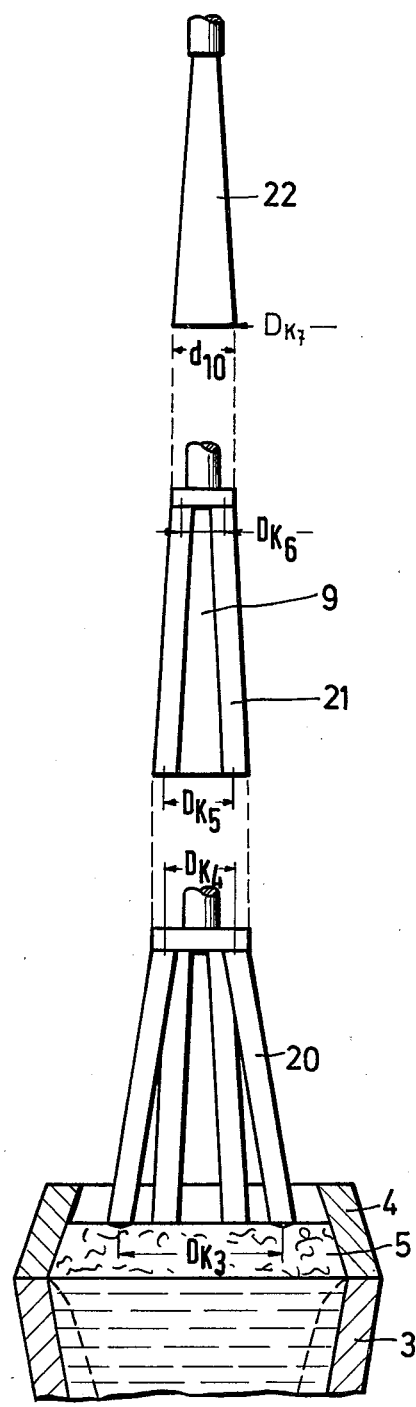

METHOD OF AND APPARATUS FOR PRODUCING STEEL INGOTS

BACKGROUND OF THE INVENTION

The invention relates to a method and apparatus for producing ingots of unalloyed and alloyed steels having an improved primary crystallization, reduced ingot segregation and a reduced content of non-metallic inclusions, wherein, in a known way (German Auslegeschrift No. 1,812,102), molten steel is poured into a mould first, whereupon a slag mixture is supplied onto it and this slag bath in turn is supplied with energy via one or more consumable electrodes during the solidification of the steel. The energy advantageously corresponds to at least 120 kilowatt-hours per metric-ton of ingot weight. Such a mould preferably is a mould merely subjected to the surrounding atmosphere, i.e. a mould like that in the German reference which is not cooled by special means, such as a liquid.

For carrying out this method an apparatus can be used in which a top part accommodating the slag bath and having cooled walls or walls lined with refractory material is placed on the upper rim of the mould or on the ingot.

An important prerequisite for producing high-quality ingots is that on the bordering face between the molten metal and slag, temperatures prevail in the slag bath up to the area near the wall of the top part above the solidifying ingot, which temperatures are above the liquidus temperature of the cast steel, and that, during the solidification of the ingot, no changes in the flow processes within the molten ingot part disadvantageously influencing the crystallization of the ingot will occur when applying this method.

When producing ingots with large diameters, difficulties may arise when the slag bath is to be heated and kept at high temperatures with a single electrode. There is an intensive heat decrease from the electrode towards the top part device, and therefore it is necessary to strongly heat the slag in the region of the immersed electrode in order to be able to supply the necessary energy and to make use of the great slag bath heights for obtaining a sufficient distribution of heat. The intensive heat decrease from the electrode towards the top part device in connection with the requirement that, at least at the beginning of the process, the slag layer on the total bordering face between the molten ingot and the slag bath is to be kept at temperatures above the liquidus temperature, necessitates using a consumable electrode with a large diameter and great slag bath heights. However, when supplying the electric energy necessary for maintaining the most favourable slag bath temperature, the disadvantage will arise that electrodes with large diameters have a considerably higher melting-off rate than would correspond to the shrinking of the ingot when solidifying. In other words, more metal is dripping from the electrode than the process would require, thus leading to disadvantages as regards the economy of the process as well as the quality of the ingot produced. Also with small changes in the electric energy supply, detrimental flows in the molten ingot part will be created by great slag bath heights, thus causing inhomogeneities within the ingot structure.

Sufficient temperature distribution when using one or more electrodes has so far been achieved only by great slag bath heights and high electric energy supply, which again reduces the economy of the process, increases the machinery required, e.g. the slag melting aggregates, and requires special measures as regards the energy supply to the slag bath during the solidification of the ingot, in order to produce high-quality ingots.

SUMMARY OF THE INVENTION

The invention aims at avoiding the above-mentioned disadvantages and difficulties and has as its object to provide a method and apparatus for producing ingots of unalloyed and alloyed steels at a considerably improved quality, which on the one hand, ensure, under sufficient energy supply to the slag bath, a sufficient, yet not too high melting-off rate with regard to the shrinking of the ingot, and, on the other hand, to enable a possibly homogenous temperature distribution in the slag bath and the prevention of detrimental segregation signs.

Further objects of the invention are the adaptability of the method and the apparatus to the crystallization progress of the ingot, an improvement of the economy of the method and a reduction of the machinery required.

The invention is based on the knowledge that, in order to achieve optimum ingot quality, the slag bath has to be kept at a certain height related to the distance of the electrode(s) from the mould inner face and that, furthermore a certain ratio of the total cross sectional area of the electrode(s) immersed in the slag bath to the cross sectional area of the mould, is essential.

These process parameters help to achieve this object when applied and comprise a slag bath height $H_S$ (in cm) which corresponds to the relationship 0.15 (A + 100) at most, wherein A is the shortest distance between the inner mould wall and the electrode(s) in centimeters and amount to at least 5 cm; and electrodes of such dimensions that the ratio of the areas of the electrode cross section(s) to the area of the upper mould cross section is 1 : 10 at the most. When applying these rules, such a constant temperature of the slag and a heat introduction to the slag over a large area is ensured that an improvement of the ingot quality is achieved. Possible short-time fluctuations in the electric energy supply are balanced out to the effect that no fluctuations influencing the ingot crystallization are created on the bordering face between the slag and steel ingot. By this uniform primary crystallization is achieved and signs of segregation are prevented.

According to a preferred embodiment electrodes are used with such dimensions that the ratio of the electrode cross sectional area(s) to the cross sectional area of the mould is 1 : 15 to 1 : 30.

The method according to the invention, after the crystallization of the ingot begins, can be controlled in such a way that, with increasing solidification of the ingot, the distance between the inner mould wall and the electrode(s) becomes larger.

The invention furthermore comprises various apparatus for advantageously carrying out the method. According to a preferred embodiment, the apparatus comprises a mould accommodating the molten steel, a top part to be placed on the mould and accommodating the slag mixture, and an electrode tubularly designed with the annular cross sectional area of the electrode immersed into the slag bath. The electric energy is supplied to a slag bath "in an annular way", thus leading to considerably uniform heat distribution. The electrode area immersed in the slag bath, which determines the melting-off rate of the electrode, is comparatively small, considerably smaller than the annular cross sectional area of a massive electrode. This means that the ratio of the annular area at which the energy is introduced into the slag bath, to the upper surface of the slag bath or the cross sectional area of the mould, respectively, is small as compared to the prior art method. Therefore it is possible to keep the melting-off rate low with an optimum heat distribution in the slag bath, i.e. to have the electrode melted off only to such a degree as is used up by the shrinking of the ingot.

According to a different embodiment the tubular electrode can be designed like a truncated cone, and a plurality of such electrode tubes can be fastened successively on an electrode holder, the lower diameter of each frustoconical tube corresponding to the upper diameter of the preceding tube. In this manner, the diameter of the ring of the heat introduction into the slag bath is adjusted to the progression of the ingot crystallization, by decreasing accordingly the zone of high and uniform temperature in the slag bath through a reduction of the diameter of the electrode tubes.

According to a different embodiment of the invention a plurality of stick electrodes with small diameters can be arranged about the longitudinal axis of the mould in an annular way instead of electrode tubes, wherein it is possible that they are arranged about the longitudinal axis of the mould in the form of a symmetrical polygon.

Also here it is advantageous for the stick electrodes arranged like a polygon about the longitudinal axis of the mould, to be inclined relative to the longitudinal axis and to form a bundle having the form of a truncated pyramid.

Analagous to the frustoconical tubes, also here a plurality of frustopyramid bundles can be provided to be successively fastened on the electrode holder, the lower cross section of a bundle each corresponding to the upper cross section of the preceding bundle. Also in this embodiment, there is the advantage that the diameter of the ring of the heat introduction into the slag bath can be adjusted to the progression of the ingot crystallization by reducing the distance between the individual electrodes. The stick-shaped single electrodes can have a round or square cross section.

BRIEF DESCRIPTION OF THE DRAWINGS

The method according to the invention and the apparatus for carrying it out shall now be described in more detail by way of example only and with reference to the accompanying drawings, wherein:

FIG. 3 is a vertical section through one embodiment of the apparatus according to the invention, FIG. 4 schematically illustrates a plan view of the apparatus of FIG. 3, FIG. 5 shows a third embodiment in vertical section, FIG. 6 is the respective schematic plan view of the apparatus of FIG. 5, FIGS. 8 and 9 are side views of electrode sets, whose individual parts are successively fastened on the electrode holder according to the progress of the ingot solidification

DESCRIPTION OF EXEMPLARY EMBODIMENTS

Figure 1:
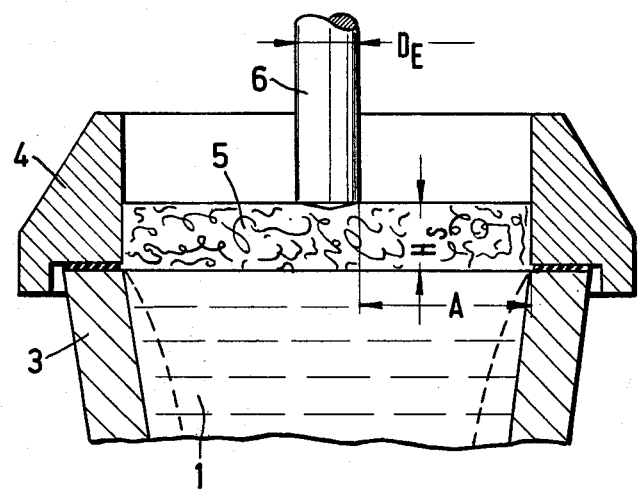
FIGS. 1 and 2 are schematic illustrations of the parameters relevant for the slag bath height to be observed.

FIG. 1 shows a polygonal mould 3 to be used in a steel-making plant, which mould is placed on a bottom plate (not illustrated). A cooled slag container 4 is placed on top of it. The mould is filled with molten steel 1 up to the upper rim; a liquid slag mixture 5 in contact with the steel level, has been introduced into the slag container 4. An electrode 6 is fastened on an electrode holder and the bottom plate as well as the electrode holder are connectable to a source of electric power. The diameter of the stick-shaped electrode is denoted by $D_E$ and the height of the slag bath is denoted by $H_S$.

The following three experiments were carried out basically with the apparatus illustrated:

EXPERIMENT 1

A mould having a medium diameter of 94 cm was filled in 4 minutes by bottom-pouring 6.1 metric tons of steel into it. The amount of the liquid slag mixture introduced into the cooled top part was 400 kg. The electrode had a diameter $D_E$ of 15 cm. A current of 3000 A was sent through the slag bath, thus leading to a slag bath temperature of 1,685° C., due to the released Joule heat. The electric energy was supplied during a period of 320 minutes.

After 100, 200 and 300 minutes the energy supply was interrupted for an average of 8 minutes. The slag bath height $H_S$ was 20 cm. The shortest horizontal distance A between the electrode surface and the vertical extension of the mould inner wall was 39.6 cm. Using the above-mentioned parameters according to the present invention, the calculated maximum slag bath height required was 20.9 cm. Thus, the slag bath height corresponded to the rule according to the present invention.

The upper cross sectional area of the mould was 6,940 cm², the electrode front face was 177 cm². The result was a ratio of the areas of 0.026, which again corresponded to the dimensioning rule to be applied according to the invention. A forged piece was produced from the completed ingot, from which piece a transverse disc was cut off at each end for examining the material. The structure was completely homogenous. The three-time interruption of the energy supply had caused neither segregation lines nor any other inhomogeneities.

EXPERIMENT 2

A similar mould with a medium inner diameter of 115 cm was filled up to its upper rim in 6 minutes by top-pouring 11.3 metric tons of molten steel. On the molten steel 450 kg of a liquid slag mixture were poured and a consumable electrode with a diameter of 33 cm was brought into a position until its front face was immersed in the slag. A current of 7,400 A was sent through the slag bath, which had a temperature of 1,590° C.

After 100 minutes the electric current was interrupted for 10 minutes and the electrode was removed. After the interruption a new electrode was immersed in the slag and further electric energy was supplied. After a further 100 minutes the procedure was repeated, the interruption lasting for 12 minutes. After a still further 100 minutes, another interruption was carried out for 8 minutes. The total heating of the ingot via the slag, including the interruption times, was 560 minutes. The slag bath height was 19.2 cm, the shortest distance A of the electrode surface to the ingot rim was 41 cm. The maximum slag bath height calculated according to the relation stipulated in the invention was 21.2 cm, which means that the rule of the invention was fulfilled.

The upper mould cross section was 10,470 cm$^2$, the electrode cross sectional area was 855 cm$^2$. The result was a ratio of the areas of 0.082, which again corresponds to the relationship to be observed according to the invention. Two forged pieces were produced from the solidified ingot, a sample disc being taken from each end. The examination showed a totally uniform structure without any signs of segregation.

EXPERIMENT 3

A similar, but larger mould with a medium inner diameter of 184 cm was filled up to its upper rim in 19 minutes with 40 metric ton of steel. Then 1,000 kg of liquid slag mixture were introduced into the cooled top part and an electrode with a diameter of 33 cm was immersed with its front face by 4 mm into the slag bath. By applying an electric voltage between the electrode and the bottom plate, an electric current of 11,200 A was sent through the slag bath.

After 20 minutes the slag bath temperature was 1,660° C. At 200 minutes after the beginning of heating, the electrical energy supply was interrupted and the electrode was removed. After an interruption of 20 minutes the electrode was again brought into position and the electrical energy supply was continued. After 4 hours the electrode was melted off to such a degree that it had to be replaced by a new one. For this purpose the energy supply was interrupted, the remaining electrode piece was removed and a new electrode with the same diameter was brought into position, its front face again being immersed by 4 mm into the slag bath. About 8 minutes were necessary for exchanging the electrodes. After 1,300 minutes the energy supply was again interrupted. After 1,350 minutes the solidified ingot was taken out of the mould. A distance A of 75.5 cm was measured between the electrode surface and the mould inner wall. The maximum allowable slag bath height was determined by calculation — 26.3 cm; the actual height of the slag bath was kept at 22 cm, which corresponds to the relationship according to the invention.

The upper cross sectional area of the mould was 26,560 cm$^2$, the cross section of the electrode 854 cm$^2$. The result was a ratio of the electrode cross sectional area to the mould cross sectional area of 0.032, which again corresponded to the relationship to be observed according to the invention. The forged ingot produced was processed into a generator axle and subjected to a thorough metallurgical examination. The structure was uniform, the interruption of the energy supply did not cause any inhomogeneities or segregation lines.

Figure 2:
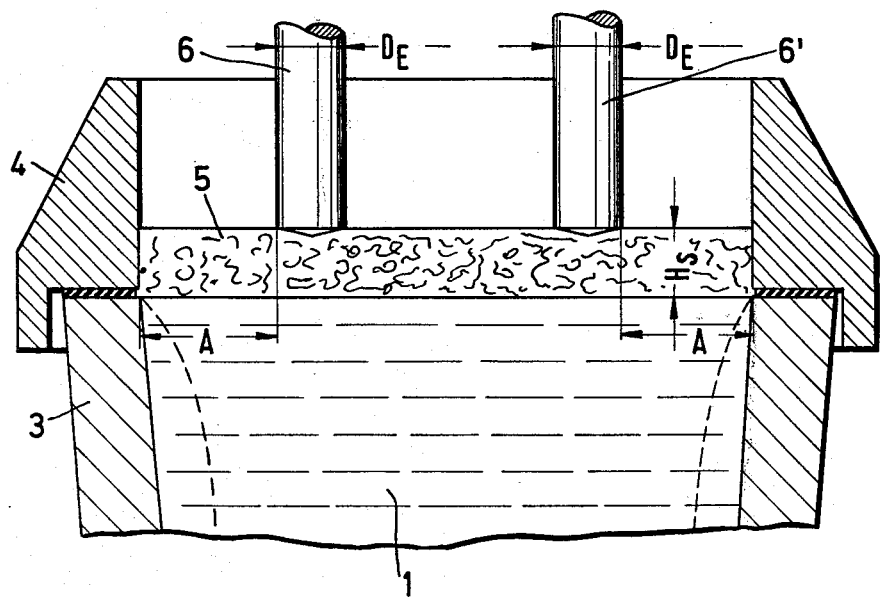

In FIG. 2 two or more electrodes 6 and 6' arranged symmetrically with respect to the longitudinal axis of the mould are provided instead of a single, centrally arranged electrode; the rest of the arrangement is the same as in FIG. 1.

According to the embodiment of FIGS. 3 and 4 a mould 3 to be used in a steel making plant is placed on a bottom plate 2. A slag container 4 is placed on top of the mould, the side walls of which container taper conically in the upward direction. The mould is filled up to its upper rim with molten steel 1, whereupon a liquid slag mixture 5 is introduced into the slag container 4. A tubular electrode 7 is fastened on the electrode holder, and the bottom plate 2 and the electrode holder are connected to a source of electric power 8. The inner diameter of the tubular electrode is denoted by $D_R$ and the shortest horizontal distance from the electrode surface to the vertical extension of the inner mould wall is denoted by $A_1$. After turning on the electric power, the slag bath is flown through by the current and Joule heat is released by the resistance of the slag, the slag bath thus being kept at temperatures above the liquidus temperature of the steel.

The following experiment was made with the apparatus illustrated in FIGS. 3 and 4:

A polygonal mould with a medium diameter of 257 cm was filled in 25 minutes up to its upper rim with 110 metric tons of steel. Then 2,960 kg of liquid slag were introduced into the water-cooled top part. An electrode tube with an inner diameter of 89 cm and a wall thickness of 3 cm was immersed into the center of the slag bath, the immersion depth being 5 mm. After applying an electric voltage between the tube and the bottom plate, an electric current of 14,180 A was sent through the slag. At 20 minutes after the beginning of the heating, the slag bath temperature was 1,650° C. The total time of heating was 2,700 minutes. The energy supplied to the slag bath was interrupted four times for a period of 8 minutes in order to replace the molten electrode tube by a new one. The distance $A_1$ between the outer surface of the electrode tube and the inner mould wall was 86.5 cm. The calculated maximum allowable slag bath height was 28.0 cm according to the relationship of the invention; actually, a slag bath height of 26 cm was used and thus the ratio according to the invention was observed.

The upper mould cross section was 51,760 cm$^2$, the cross sectional area of the tube wall immersed in the slag was 867 cm$^2$. The ratio of the area of the electrode cross section to the area of the upper ingot cross section was thus 0.0168, thus being lower than the maximum value of 0.1 which was to be observed according to the invention. A generator axle was forged from the solidified ingot and subjected to thorough metallurgical examinations. A uniform quality without inhomogeneities was observed.

With the embodiment according to FIGS. 5 and 6 again a mould 3 is placed on a bottom plate 2 and carries a slag container 4, which may be water-cooled or lined with refractory material. Steel 1 is poured into the mould up to its upper rim and a liquid slag mixture 5 is introduced into the top part 4. Six stick electrodes 10 are symmetrically arranged about the longitudinal axis 9 of the mould and the slag top part 4, respectively, and are fastened on the electrode holder. The electrode holder and the bottom plate are again connected to a source of electric power 8. The stick electrodes 10 are solidly formed having a diameter of $D_E$. The distance of two oppositely arranged electrodes is $D_K$; the shortest distance of each electrode to the inner wall is denoted by $A_2$.

With the above-defined apparatus the following experiment was carried out:

A polygonal mould with a medium diameter of 330 cm was used. During a period of 33 minutes, 240 metric tons of steel were top-poured into the mould, which was filled up to its upper rim. Next, 5,500 kg of liquid slag were introduced into the water-cooled top part and onto the steel level. A bundle comprised of six electrodes each having a diameter $D_E$ of 20 cm was fastened on the electrode holder and immersed by 4 mm into the slag bath. The diameter $D_K$ of the circle, on which the electrode centers were arranged at equal distances from each other, was 130 cm. By applying an electric voltage a current flow of 19,870 A was obtained. At 15 minutes after the beginning of energy supply the slag bath temperature was 1,610° C. Heating lasted for a total of 4,600 minutes, with 10 interruptions of approximately 6 minutes each, in order to exchange the electrodes. The shortest distance $A_2$ of each electrode to the mould inner wall was 90 cm.

The slag bath height was 26 cm, thus falling within the relationship to be observed according to the invention which would allow a maximum height of 28.5 cm. The sum of the electrode cross sections immersed in the slag bath was 1,885 cm$^2$, the upper cross sectional area of the ingot was 85,530 cm$^2$. The result was a ratio of the areas of 0.022, thus being within the range according to the invention. Forging pieces were produced from the ingot with a uniformly homogenous structure, without the interruptions having caused defauls in the structure.

Figure 7:
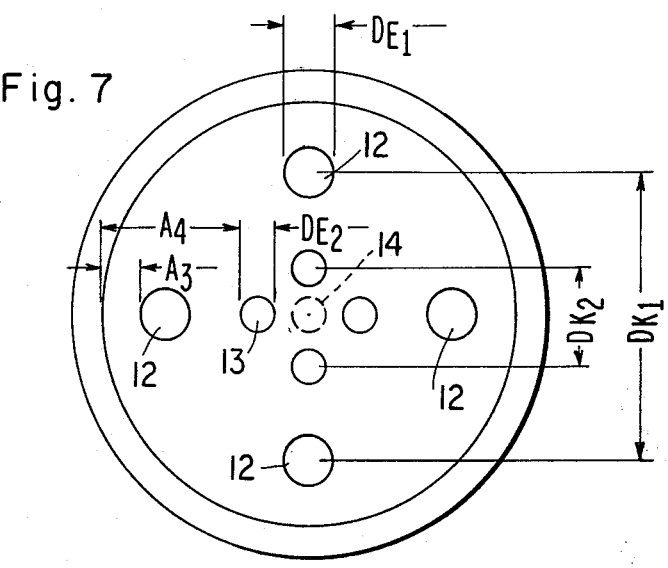
FIG. 7 shows a varied embodiment in the schematic ground plan.

In the embodiment according to FIG. 7 four large stick electrodes 12 are first fastened on the electrode holder, the electrodes having a diameter $D_{E_1}$ and being arranged at a distance $A_3$ from the inner wall of the mould. The distance between two oppositely arranged stick electrodes 12 is $D_{K_1}$. The remaining parts of the apparatus are the same as in FIGS. 5 and 6. Electric current is supplied to the slag bath. After the rim zone of the ingot has solidified the electrodes 12 are detached and four electrodes 13 are symmetrically fastened on the electrode holder, these electrodes having a diameter $D_{E_2}$ and being arranged at a distance $A_4$ from the inner wall of the mould. The distance between two oppositely arranged stick electrodes 13 is $D_{K_2}$. Finally, those four electrodes can be replaced by a single stick electrode, which is centrally arranged and with which the process can be brought to an end.

In the embodiment according to FIG. 8 a tubular, frustoconical electrode 15 is fastened on the electrode holder, the lower diameter of which electrode is denoted by $D_{R_1}$ and the upper diameter by $D_{R_2}$. The remaining parts of the apparatus, i.e. the bottom plate, the mould, the top part for the slag and the source of electric power are the same as those already described in connection with FIGS. 3 and 4 and FIGS. 5 and 6, respectively. Further tubular electrodes 16, 17 and 18, also shaped like truncated cones, are made ready. The lower diameter of the electrode 16 is denoted by $D_{R_3}$. It is of the same length as the upper diameter $D_{R_2}$ of the electrode 15 previously used. The upper diameter $D_{R_4}$ of the electrode 16 corresponds to the lower diameter $D_{R_5}$ of the electrode 17, etc., so that the electrodes can be successively fastened on the electrode holder according to their melting-off. The final electrode 19 is a massive solid stick electrode, which, however, — like the preceding electrodes 16, 17 and 18 — has an inclination relative to the longitudinal axis.

FIG. 9 is an illustration similar to FIG. 8, but here a plurality of frustopyramid-shaped bundles formed by stick electrodes are provided instead of tubular, frustoconical electrodes. The individual bundles thus comprise stick electrodes 20 polygonally arranged about the longitudinal axis 9 of the mould, having an inclination relative to the longitudinal axis 9, and forming a frustopyramid-shaped structure. The lower distance between two oppositely arranged stick electrodes is denoted by $D_{K_3}$ and the upper distance is denoted by $D_{K_4}$, which values correspond to the diameters $D_{R_1}$ and $D_{R_2}$ of the embodiment according to FIG. 8. Further bundles formed of sticks are denoted by 21 and 22, the lower distances $D_{K_5}$ and $D_{K_7}$ each corresponding to the upper distance of the preceding electrode bundle. The final stick electrode is solid, its lower diameter $D_{K_7}$ corresponding to the distance $D_{K_6}$.

Figure 10:
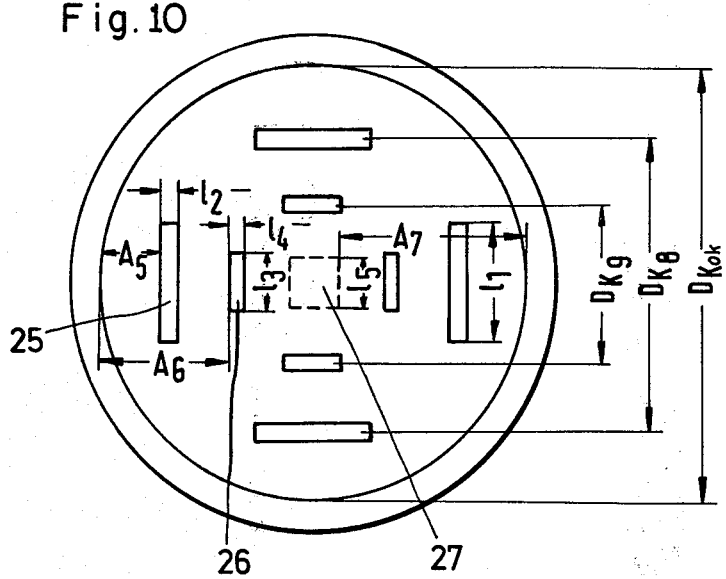
FIG. 10 is a plan view of a further embodiment.

FIG. 10 shows a further embodiment, in which electrodes having a rectangular cross section are used. First a ring of four electrodes 25 symmetrically arranged with respect to the longitudinal axis 9, having the dimensions $l_1 \times l_2$ and arranged at the shortest distance $A_5$ from the inner wall of the mould, are used. Then after melting of the outer electrodes and the progression of the solidification, a ring of four inner electrodes 26 arranged about the longitudinal axis 9, having the dimensions $l_3 \times l_4$ and arranged at a distance $A_6$ from the inner wall are put into operation. Finally a central square electrode 27 with the side length $l_5$, arranged at a distance $A_7$ from the inner wall of the mould is used when electrodes 26 melt. The inner diameter of the mould is marked with $D_{Kok}$; the distance between two oppositely arranged electrodes 25 is $D_{K_8}$ and that of two oppositely arranged electrodes 26 is $D_{K_9}$.

I claim:

1. In a method of producing ingots of unalloyed and alloyed steels having an improved primary crystallization, reduced ingot segregation and a reduced content of non-metallic inclusions, in which molten steel is poured into a mould having a mould cross sectional area and a mould inner wall, a slag mixture is supplied onto said molten steel to form a slag bath having a certain slag bath height, and at least one consumable electrode having an electrode cross sectional area is provided to supply said slag bath with energy while the steel solidifies, the improvement comprising using a slag bath height $H_S$ given in cm and maximally corresponding to 0.15 (A + 100), A being the shortest distance between said mould inner wall and said at least one electrode, given in cm and amounting to at least 5 cm; and selecting said at least one electrode to have such dimensions as to give a ratio of said electrode cross-sectional area to said mould cross-sectional area of 1 : 10 at the most.

2. A method as set forth in claim 1, wherein said ratio of said electrode cross-sectional area to said mould cross-sectional area amounts to between 1 : 15 and 1 : 30.

3. A method as set forth in claim 1, wherein said shortest distance between said mould inner wall and said at least one electrode is enlarged with increasing solidification of said ingot.

4. In an arrangement for producing ingots of unalloyed and alloyed steels having an improved primary crystallization, reduced ingot segregation and a reduced content of non-metallic inclusions, of the type including a mould having an inner mould wall and a mould cross sectional area and accommodating molten steel, a top part to be placed on said mould and capable of accommodating a slag mixture, said slag mixture forming a slag bath having a certain height, and at least one liftable and lowerable consumable electrode having an electrode cross sectional area, said electrode being connectable to a source of electric power and mounted on an electrode holder for supplying energy to the slag bath while the steel solidifies, the improvement which is characterized in that said at least one consumable electrode is tubular and has an annular cross-sectional face immersed in the slag bath; the slag bath has a height $H_S$ given in cm and maximally corresponding to 0.15 (A + 100), A being the shortest distance between the inner wall of the mould and said at least one consumable electrode, given in cm; and amounting to at least 5 cm, and said at least one consumable electrode has such dimensions that there results a ratio of electrode cross-sectional area to mould cross-sectional area of maximally 1 : 10.

5. An arrangement as set forth in claim 4, wherein said at least one tubular electrode is formed like a truncated cone.

6. An arrangement as set forth in claim 5, wherein a plurality of truncated-cone-shaped tubular electrodes are provided to be successively fastened to said electrode holder, each truncated-cone-shaped tubular electrode having a lower diameter and an upper diameter, the lower diameter of each truncated-cone-shaped tubular electrode corresponding to the upper diameter of the preceding truncated-cone-shaped tubular electrode.

7. In an arrangement for producing ingots of unalloyed and alloyed steels having an improved primary crystallization, reduced ingot segregation and a reduced content of non-metallic inclusions, of the type including a mould having an inner wall and a mould cross-sectional area and accommodating molten steel, a top part to be placed on said mould and capable of accommodating a slag mixture, said slag mixture forming a slag bath having a certain height, the mould having a longitudinal axis, the improvement which is characterized in that a plurality of consumable electrodes are annularly arranged about said longitudinal axis, each having an electrode cross-sectional area, being connectable to a source of electric power and mounted on an electrode holder for supplying energy to the slag bath while the steel solidifies; the slag bath has a height $H_S$ given in cm and maximally corresponding to 0.15 (A + 100), A being the shortest distance between the inner wall of the mould and one consumable electrode, given in cm, and amounting to at least 5 cm; and said plurality of consumable electrodes have such dimensions that there results a ratio of electrode cross-sectional areas to mould cross-sectional area of maximally 1 : 10.

8. In an arrangement for producing ingots of unalloyed and alloyed steels having an improved primary crystallization, reduced ingot segregation and a reduced content of non-metallic inclusions, of the type including a mould having an inner wall and a mould cross-sectional area and accommodating molten steel, a top part to be placed on said mould and capable of accommodating a slag mixture, said slag mixture forming a slag bath having a certain height, the mould having a longitudinal axis, the improvement which is characterized in that a plurality of consumable electrodes are arranged like a symmetrical polygon about said longitudinal axis, each having an electrode cross-sectional area, being connectable to a source of electric power and mounted on an electrode holder for supplying energy to the slag bath while the steel solidifies; the slag bath has a height $H_S$ given in cm and maximally corresponding to 0.15 (A + 100), A being the shortest distance between the inner wall of the mould and one consumable electrode, given in cm, and amounting to at least 5 cm; and said plurality of consumable electrodes have such dimensions that there results a ratio of electrode cross-sectional areas to mould cross-sectional area of maximally 1 : 10.

9. An arrangement as set forth in claim 8, wherein said plurality of consumable electrodes polygonally arranged about the longitudinal axis of the mould are inclined relative to said longitudinal axis so as to form a frustopyramid-shaped bundle.

10. An arrangement as set forth in claim 9, wherein a plurality of frustopyramid-shaped bundles are provided to be successively fastened to said electrode holder, each bundle having an upper cross section and a lower cross section, the lower cross section of each bundle corresponding to the upper cross section of the preceding bundle.

* * * * *

UNITED STATES PATENT AND TRADEMARK OFFICE
CERTIFICATE OF CORRECTION

PATENT NO. : 4,134,443

DATED : Jan. 16, 1979

INVENTOR(S) : Peter Machner

It is certified that error appears in the above-identified patent and that said Letters Patent are hereby corrected as shown below:

First page, Item [73], "Vereinigte Edelstahlwerke Aktiengesellschaft" should read --Vereinigte Edelstahlwerke Aktiengesellschaft (VEW)--.

First page, 4th-from-bottom line of ABSTRACT, after "Also," insert --the--.

Col. 2, line 44, before "steel" insert --the--; line 64, after "to" (2nd occurrence), insert --a--.

Col. 7, line 53, delete "massive".

Col. 9, line 1, "cm; and amounting to at least 5 cm," should read --cm, and amounting to at least 5 cm;--.

Signed and Sealed this

Twenty-ninth Day of May 1979

[SEAL]

Attest:

RUTH C. MASON
Attesting Officer

DONALD W. BANNER
Commissioner of Patents and Trademarks